(12) United States Patent
Zhong et al.

(10) Patent No.: US 11,728,763 B1
(45) Date of Patent: Aug. 15, 2023

(54) LOCK ASSEMBLY, SOLAR PANEL MOUNTING APPARATUS, AND RECREATIONAL VEHICLE

(71) Applicant: Shenzhen Hello Tech Energy Co Ltd, Shenzhen (CN)

(72) Inventors: Weijie Zhong, Shenzhen (CN); Xiangwen Luo, Shenzhen (CN); Zhongwei Sun, Shenzhen (CN)

(73) Assignee: SHENZHEN HELLO TECH ENERGY CO LTD, Shenzhen (CN)

( * ) Notice: Subject to any disclaimer, the term of this patent is extended or adjusted under 35 U.S.C. 154(b) by 0 days.

(21) Appl. No.: 17/822,370

(22) Filed: Aug. 25, 2022

(30) Foreign Application Priority Data

Feb. 16, 2022 (CN) .......................... 202210139592.X

(51) Int. Cl.
*H02S 20/30* (2014.01)
(52) U.S. Cl.
CPC .................................... *H02S 20/30* (2014.12)
(58) Field of Classification Search
None
See application file for complete search history.

(56) References Cited

U.S. PATENT DOCUMENTS

| 2009/0165841 | A1* | 7/2009 | Gunn, Jr. | ................ | H02S 20/00 |
| | | | | | 136/245 |
| 2013/0037081 | A1 | 2/2013 | Grant | | |
| 2014/0352757 | A1* | 12/2014 | Ramirez | ............... | F24S 30/452 |
| | | | | | 136/246 |
| 2016/0297287 | A1* | 10/2016 | Means | ................... | B60J 7/1642 |

FOREIGN PATENT DOCUMENTS

| CN | 204383178 U | 6/2015 |
| CN | 105245163 | 1/2016 |
| CN | 205277086 U | 6/2016 |
| CN | 206456282 U | 9/2017 |
| CN | 107672511 A | 2/2018 |
| CN | 108551301 A | 9/2018 |
| CN | 109160140 | 1/2019 |

(Continued)

OTHER PUBLICATIONS

Office Action dated Apr. 11, 2023 from corresponding JP Application No. 2022131223.

(Continued)

*Primary Examiner* — Daniel P Malley, Jr.
(74) *Attorney, Agent, or Firm* — ArentFox Schiff LLP

(57) ABSTRACT

A lock assembly includes a driving member, a locking member, and a latch. The driving member includes a connection end, and a driving end movable with respect to the connection end. The connection end is arranged on a fastener. The locking member is rotatably arranged on a carrier through a first rotation shaft. The driving end is rotatably connected to the locking member through a second rotation shaft. The locking member includes a hook. The latch is arranged on the fastener. The hook is capable of hooking the latch. The driving end is configured to capable of driving the hook to disengage from the latch, and driving the carrier to rotate with respect to the fastener, or the driving end is configured to drive the hook to hook the latch so that the carrier is secured to the fastener.

8 Claims, 1 Drawing Sheet

(56) References Cited

FOREIGN PATENT DOCUMENTS

| | | |
|---|---|---|
| CN | 109160140 A | 1/2019 |
| CN | 110350849 A | 10/2019 |
| CN | 211930553 U | 11/2020 |
| CN | 114050761 | 2/2022 |
| FR | 2995071 | 3/2014 |
| JP | 2016042778 A | 3/2016 |
| JP | 2016120730 A | 7/2016 |
| JP | 2020142666 A | 9/2020 |

OTHER PUBLICATIONS

First Office Action issued in connection with related Chinese Patent Application 202210139592.X, dated Mar. 25, 2022.
Second Office Action issued in connection with related Chinese Patent Application 202210139592.X, dated Apr. 21, 2022.
European Search Report dated May 12, 2023 in corresponding EP Application No. 22189130.2-1002.

\* cited by examiner

LOCK ASSEMBLY, SOLAR PANEL MOUNTING APPARATUS, AND RECREATIONAL VEHICLE

CROSS-REFERENCE TO RELATED APPLICATION(S)

This application claims priority to Chinese Patent Application No. 202210139592.X filed Feb. 16, 2022, the disclosure of which is incorporated herein by reference in its entirety.

TECHNICAL FIELD

The present disclosure relates to the field of recreational vehicles and, in particular, a lock assembly, a solar panel mounting apparatus, and a recreational vehicle.

BACKGROUND

A recreational vehicle for a long outdoor journey is usually powered by a solar panel mounted on the roof to supplement the power of various electrical devices. The irradiation angle of the sun changes every hour and every minute during the daytime, and in spring, summer, autumn, and winter. To make the solar panel fully receive sunlight, a user needs to temporarily adjust the pitch angle of the solar panel. Generally, the pitch angle is adjusted by remotely controlling an electric push rod.

In the related art, since a vehicle shakes greatly when driving, to prevent damage to brittle crystals in the solar panel, the user needs to lay the solar panel flat and secure the solar panel before starting the vehicle. In this case, the user needs to climb to the roof to manually secure the solar panel. Thus, the operation is complicated, the vehicle is easily damaged, and a certain safety hazard exists.

Therefore, it is urgent to provide a lock assembly, a solar panel mounting apparatus, and a recreational vehicle to solve the preceding problems.

SUMMARY

Based on the above, an object of the present disclosure is to provide a lock assembly, a solar panel mounting apparatus, and a recreational vehicle that are convenient to operate and good in safety.

To achieve the preceding objects, the present disclosure adopts the solutions below.

A lock assembly, configured to implement locking a carrier to a fastener, and unlocking the carrier from the fastener. The lock assembly includes a driving member, a locking member, and a latch.

The driving member includes a connection end, and a driving end movable with respect to the connection end. The connection end is arranged on the fastener.

The locking member is rotatably disposed on the carrier through a first rotation shaft. The driving end is rotatably connected to the locking member through a second rotation shaft. The locking member includes a hook.

The latch is arranged on the fastener. The hook is capable of hooking the latch.

The driving end is configured to be capable of driving the hook to disengage from the latch, and driving the carrier to rotate with respect to the fastener, or the driving end is configured to drive the hook to hook so that the carrier is secured to the fastener.

In a preferable solution of the lock assembly, the locking member is provided with a stop protrusion in a circumferential direction of the locking member. The stop protrusion and the hook are spaced apart. The carrier is provided with a stopper. When the carrier rotates with respect to the fastener, the stop protrusion abuts against the stopper.

In a preferable solution of the lock assembly, the first rotation shaft is located at the center of a section of the locking member. The second rotation shaft is parallel to the first rotation shaft.

In a preferable solution of the lock assembly, the second rotation shaft is located between the first rotation shaft and the hook.

In a preferable solution of the lock assembly, an adjustment foot is arranged on one end of the fastener away from the carrier and is configured to be capable of adjusting the height and the angle of the fastener with respect to a horizontal plane.

In a preferable solution of the lock assembly, the driving member includes a Y-shaped joint connected to one end of the driving end away from the connection end. The locking member is connected to the Y-shaped joint through the second rotation shaft.

In a preferable solution of the lock assembly, the carrier is provided with a mounting plate. The locking member is rotatably arranged on the mounting plate through the first rotation shaft.

In a preferable solution of the lock assembly, the fastener is a frame structure and the carrier is capable of being placed inside the fastener.

A solar panel mounting apparatus includes the lock assembly according to any one of the preceding solutions, and a solar panel is provided on the carrier.

A recreational vehicle includes a vehicle body, and the solar panel mounting apparatus according to any one of the preceding solutions. The solar panel mounting apparatus is arranged on the roof of the vehicle body.

The present disclosure has the beneficial effects below.

In the present disclosure, the locking member and the latch are arranged on the carrier and the fastener respectively. The locking member is rotatably arranged on the carrier through the first rotation shaft and is rotatably connected to the driving end through the second rotation shaft.

When the driving member is in operation, the driving member can firstly drive the hook on the locking member to disengage from the latch and then drive the carrier to rotate with respect to the fastener, implementing unlocking the carrier from the fastener, and adjusting the position of the carrier with respect to the fastener. In addition, the driving member can also drive the hook to hook the latch, achieving securing the carrier with respect to the fastener. The connection is convenient, fast, and firm, and the safety is better.

BRIEF DESCRIPTION OF DRAWINGS

To illustrate the solutions in embodiments of the present disclosure more clearly, the drawings used in description of the embodiments will be briefly described below. Apparently, the drawings described below illustrate part of the embodiments of the present disclosure, and those of ordinary skill in the art may obtain other drawings based on the drawings described below on the premise that no creative work is done.

Figure 1:
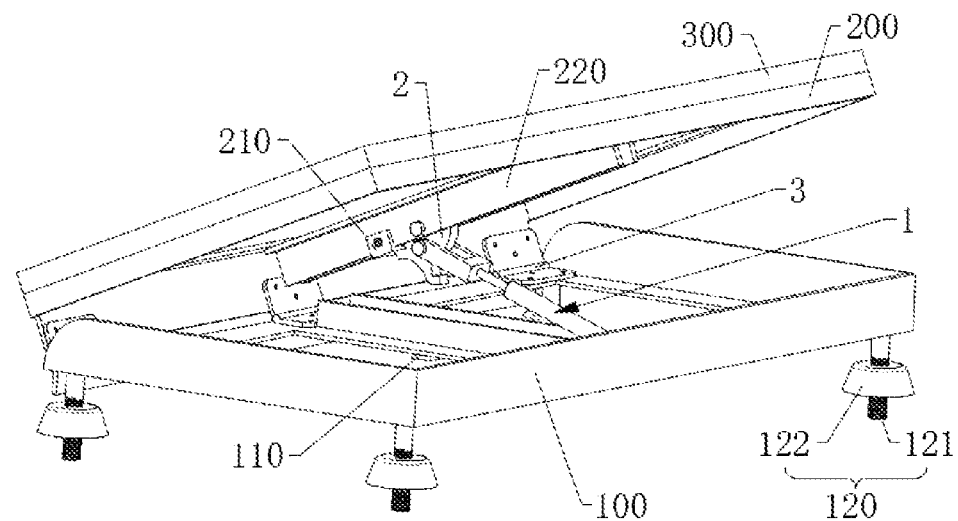
FIG. 1 is a schematic diagram of a lock assembly according to an embodiment of the present disclosure.

REFERENCE LIST 100 fastener
110 latch
120 adjustment foot
121 adjustment bolt
122 adjustment block
200 carrier
210 stopper
220 mounting plate
300 solar panel
1 driving member
11 connection end
12 driving end
13 Y-shaped joint
2 locking member
21 first rotation shaft
22 second rotation shaft
23 hook
24 stop protrusion
3 hinge

DETAILED DESCRIPTION

To make solved problems, adopted solutions, and achieved effects of the present disclosure more apparent, the solutions of the present disclosure are further described in conjunction with the drawings and embodiments. The embodiments described below are part, not all, of embodiments of the present disclosure. Based on the embodiments of the present disclosure, all other embodiments acquired by those skilled in the art are within the scope of the present disclosure on the premise that no creative work is done.

Figure 2:
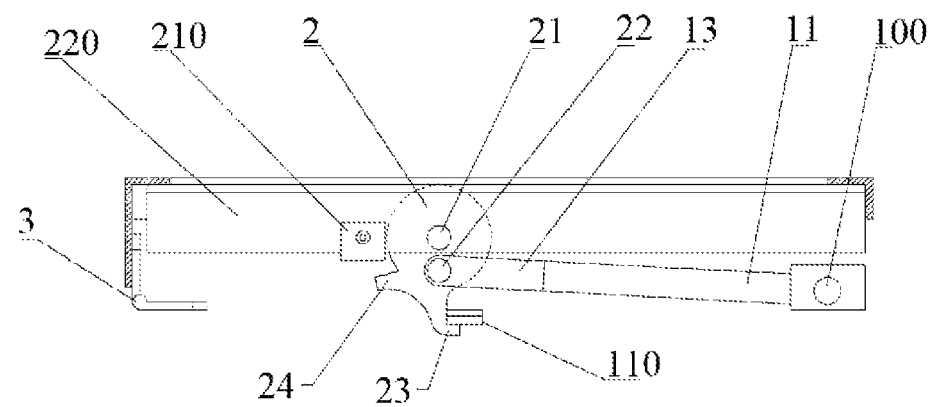
FIG. 2 is a schematic diagram of a lock assembly taken when a carrier is locked to a fastener according to an embodiment of the present disclosure.
Figure 3:
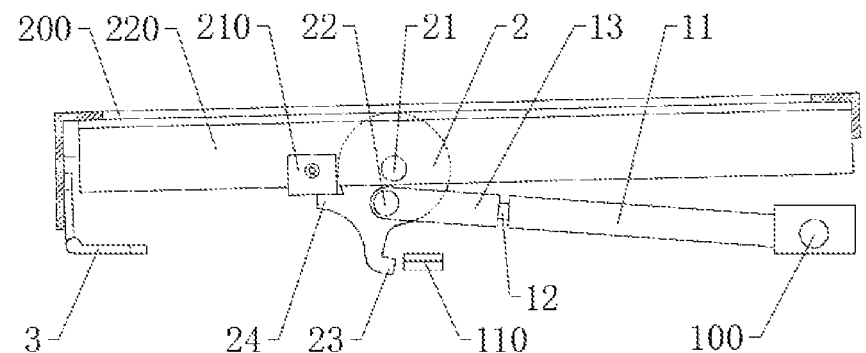
FIG. 3 is a schematic diagram of a lock assembly taken when a carrier is unlocked from a fastener according to an embodiment of the present disclosure.

As shown in FIGS. 1 to 3, the present embodiment provides a lock assembly configured to implement locking a carrier 200 to a fastener 100, and unlocking the carrier 200 from the fastener 100. The lock assembly includes a driving member 1, a locking member 2, and a latch 110. The driving member 1 includes a connection end 11, and a driving end 12 movable with respect to the connection end 11. The connection end 11 is arranged on the fastener 100.

The locking member 2 has a roughly circular section, and a hook 23 extends from the peripheral edge of the locking member 2. The center of the locking member 2 is rotatably arranged on the carrier 200 through a first rotation shaft 21, and the driving end 12 is rotatably connected to the locking member 2 through a second rotation shaft 22. The second rotation shaft 22 is parallel to the first rotation shaft 21 and is located between the first rotation shaft 21 and the hook 23. The latch 110 is arranged on the fastener 100. The hook 23 can hook the latch 110. The driving end 12 is configured to be capable of driving the hook 23 to disengage from the latch 110, and driving the carrier 200 to rotate with respect to the fastener 100, or the driving end 12 is configured to drive the hook 23 to hook the latch 110 so that the carrier 200 is secured to the fastener 100.

The latch 110 is arranged on the fastener 100, and the locking member 2 is arranged on the carrier 200. The locking member 2 is rotatably arranged on the carrier 200 through the first rotation shaft 21 and is rotatably connected to the driving end 12 through the second rotation shaft 22. When the driving member 1 is in operation, firstly, the driving member 1 can drive the hook 23 on the locking member 2 to disengage from the latch 110, and then drive the carrier 200 to rotate with respect to the fastener 100, achieving the unlocking the carrier 200 from the fastener 100 and adjusting the position of the carrier 200 relative to the fastener 100. In addition, the driving member 1 can also drive the hook 23 to hook the latch 110, achieving securing the carrier 200 with respect to the fastener 100. The connection is convenient, fast, and firm, and the safety is better.

The present embodiment also discloses a solar panel mounting apparatus including the lock assembly described above. A solar panel 300 is provided on the carrier 200. In the solar panel mounting apparatus having the lock assembly, the carrier 200 can move with respect to the fastener 100 so as to reduce the height and the angle of the solar panel 300. In addition, the carrier 200 can also be locked with respect to the fastener 100 so as to reduce unnecessary shaking of the solar panel 300, thereby reducing damage to brittle crystals inside the solar panel 300 and prolonging the service life of the solar panel 300.

The present embodiment also discloses a recreational vehicle including a vehicle body and the solar panel mounting apparatus described above. The solar panel mounting apparatus is arranged on the roof of the vehicle body. When the recreational vehicle starts, the solar panel 300 is secured with respect to the vehicle body through the lock assembly, preventing the solar panel 300 from shaking when the vehicle is started. Meanwhile, a user does not need to climb to the roof of the recreational vehicle, and the locking and the unlocking are much more convenient and safer.

It is to be noted that the fastener 100 of the solar panel mounting apparatus may be provided on the vehicle body, or the roof of the vehicle body of the recreational vehicle may serve as the fastener 100 of the solar panel mounting apparatus. The fastener can be set by those skilled in the art according to practical situations and is not limited herein.

In an optional solution of the lock assembly, adjustment feet 120 are arranged on one end of the fastener 100 away from the carrier 200. Each of the adjustment feet 120 is configured to be capable of adjusting the height and the angle of the fastener 100 with respect to a horizontal plane so that the lock assembly can adapt to different solar altitude angles and vehicle body shapes.

Specifically, the adjustment foot 120 includes an adjustment bolt 121 and an adjustment block 122. The adjustment bolt 121 is threadedly connected to both the adjustment block 122 and amounting position. The adjustment block 122 abuts against the mounting position. The threaded connection position between the adjustment block 122 and the adjustment bolt 121 is adjusted, and thus the height and the angle of the fastener 100 with respect to the mounting position are adjusted.

Optionally, four adjustment feet 120 are provided and are disposed at four corners of the fastener 100.

In an optional solution of the lock assembly, the carrier 200 is rotatably connected to the fastener 100. When the driving end 12 drives the latch 110 to disengage from the hook 23 and drives the carrier 200 to rotate with respect to the fastener 100 to a certain angle, it is convenient for the solar panel 300 on the carrier 200 to better face sunlight. When the driving end 12 drives the carrier 200 to rotate to fasten to the fastener 100 and drives the hook 23 to hook the latch 110, the solar panel 300 can be stably connected to the vehicle body and can be used for starting the recreational vehicle. Apparently, in other embodiments, the carrier 200 may also linearly move with respect to the fastener 100 as long as the first rotation shaft 21 and the second rotation shaft 22 on the locking member 2 are eccentrically arranged.

Specifically, to achieve the rotatable connection between the carrier 200 and the fastener 100, the lock assembly also includes hinges 3. Each of the hinges 3 is connected to the carrier 200 and the fastener 100 separately. Exemplarily, a plurality of hinges 3 are provided to ensure that the carrier 200 more reliably rotates with respect to the fastener 100.

Further, to facilitate fastening the carrier 200 to the fastener 100, the fastener 100 is a frame structure, the carrier 200 can be placed within the fastener 100 of the frame structure, facilitating reducing the overall size of the lock assembly when the hook 23 hooks the latch 110.

In the present embodiment, the driving member 1 is an electric push rod, and further includes a Y-shaped joint 13 connected to one end of the driving end 12 away from the connection end 11. The locking member 2 is connected to the Y-shaped joint 13 through the second rotation shaft 22. That is, the push rod of the electric push rod is rotatably connected to the locking member 2 through the Y-shaped joint 13. In other embodiments, the driving member 1 may also be an air cylinder or a hydraulic cylinder.

Optionally, to achieve the connection between the locking member 2 and the carrier 200, the carrier 200 is provided with a mounting plate 220. The locking member 2 is rotatably arranged on the mounting plate 220 through the first rotation shaft 21. Preferably, two mounting plates 220 are provided. The two mounting plates 220 are parallel and spaced apart. The locking member 2 is sandwiched between the two mounting plates 220 to ensure the reliability of mounting of the locking member 2.

In an optional solution of the lock assembly, the locking member 2 is provided with a stop protrusion 24 in a circumferential direction of the locking member 2. The stop protrusion 24 and the hook 23 are spaced apart. The carrier 200 is provided with a stopper 210. When the carrier 200 rotates with respect to the fastener 100, the stop protrusion 24 abuts against the stopper 210.

The process of using the lock assembly is as follows. When it is needed to unlock the carrier 200 from the fastener 100 and to drive the carrier 200 to rotate with respect to the fastener 100, first, the driving end 12 extends out of the connection end 11 to drive the locking member 2 to rotate about the first rotation shaft 21 to make the latch 110 of the locking member 2 disengage from the hook 23 until, as shown in FIG. 2, the stop protrusion 24 of the locking member 2 abuts against the stopper 210 of the carrier 200. The driving end 12 continues extending out of the connection end 11 to drive the unlocked carrier 200 to rotate with respect to the fastener 100.

When it is needed to lock the carrier 200 to the fastener 100, the driving end 12 retracts with respect to the connection end 11. Due to the gravity of the carrier 200, the stop protrusion 24 of the locking member 2 continues abutting against the stopper 210 of the carrier 200 until the carrier 200 and the fastener 100 are relatively fastened. The driving end 12 continues retracting with respect to the connection end 11 and drives the locking member 2 to rotate about the first rotation shaft 21 until, as shown in FIG. 1, the hook 23 of the locking member 2 hooks the latch 110 to achieve the locking.

In the description of the present disclosure, it is to be noted that orientations or position relations indicated by terms such as "center", "upper", "lower", "left", "right", "vertical", "horizontal", "in" and "out" are based on the drawings. These orientations or position relations are intended only to facilitate and simplify the description of the present disclosure and not to indicate or imply that a device or element referred to must have such particular orientations or must be configured or operated in such particular orientations. Thus, these orientations or position relations are not to be construed as limiting the present disclosure. In addition, terms such as "first" and "second" are used only for the purpose of description and are not to be construed as indicating or implying relative importance. Terms "first position" and "second position" are two different positions.

In the description of the present disclosure, it is to be noted that unless otherwise expressly specified and limited, the term "mounted", "connected to each other", or "connected" is to be construed in a broad sense as securely connected, detachably connected, or integrated;

mechanically connected or electrically connected; directly connected to each other or indirectly connected to each other via an intermediary, or intraconnected between two components. For those of ordinary skill in the art, specific meanings of the preceding terms in the present disclosure may be construed based on specific situations.

What is claimed is:

1. A solar panel mounting apparatus, comprising:
   a lock assembly, configured to implement locking a carrier to a fastener, and unlocking the carrier from the fastener, wherein a solar panel is provided on the carrier, and the lock assembly comprises:
   a driving member comprising a connection end, and a driving end movable with respect to the connection end, wherein the connection end is arranged on the fastener;
   a locking member rotatably arranged on the carrier through a first rotation shaft, wherein the driving end is rotatably connected to the locking member through a second rotation shaft, and the locking member comprises a hook; and
   a latch arranged on the fastener, wherein the hook is capable of hooking the latch,
   wherein the driving end is configured to be capable of driving the hook to disengage from the latch, and driving the carrier to rotate with respect to the fastener, or the driving end is configured to drive the hook to hook the latch so that the carrier is secured to the fastener.

2. The solar panel mounting apparatus according to claim 1, wherein the locking member is provided with a stop protrusion in a circumferential direction of the locking member, the stop protrusion and the hook are spaced apart, the carrier is provided with a stopper, and when the carrier rotates with respect to the fastener, the stop protrusion abuts against the stopper.

3. The solar panel mounting apparatus according to claim 1, wherein the first rotation shaft is located at a center of a section of the locking member, and the second rotation shaft is parallel to the first rotation shaft.

4. The solar panel mounting apparatus according to claim 3, wherein the second rotation shaft is located between the first rotation shaft and the hook.

5. The solar panel mounting apparatus according to claim 1, wherein an adjustment foot is arranged on one end of the fastener away from the carrier and is configured to be capable of adjusting a height and an angle of the fastener with respect to a horizontal plane.

6. The solar panel mounting apparatus according to claim 1, wherein the driving member comprises a Y-shaped joint connected to one end of the driving end away from the connection end, and the locking member is connected to the Y-shaped joint through the second rotation shaft.

7. The solar panel mounting apparatus according to claim 1, wherein the carrier is provided with a mounting plate, and the locking member is rotatably arranged on the mounting plate through the first rotation shaft.

8. The solar panel mounting apparatus according to claim 1, wherein the fastener is a frame structure and the carrier is capable of being placed inside the fastener.

* * * * *